(12) United States Patent
Endou

(10) Patent No.: US 10,539,948 B2
(45) Date of Patent: Jan. 21, 2020

(54) NUMERICAL CONTROLLER WITH PROGRAM PRESENTATION FUNCTION DEPENDING ON SITUATION

(71) Applicant: FANUC Corporation, Minamitsuru-gun, Yamanashi (JP)

(72) Inventor: Satoru Endou, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 596 days.

(21) Appl. No.: 15/080,711

(22) Filed: Mar. 25, 2016

(65) Prior Publication Data

US 2016/0282852 A1    Sep. 29, 2016

(30) Foreign Application Priority Data

Mar. 27, 2015 (JP) ................................ 2015-065798

(51) Int. Cl.
*G05B 19/409* (2006.01)
*G05B 19/4155* (2006.01)

(52) U.S. Cl.
CPC ....... *G05B 19/409* (2013.01); *G05B 19/4155* (2013.01); *G05B 2219/36061* (2013.01); *G05B 2219/36254* (2013.01)

(58) Field of Classification Search
CPC ........ G05B 19/409; G05B 2219/36061; G05B 2219/36254; G05B 19/4155; G05B 2219/33034; G05B 2219/33053
See application file for complete search history.

(56) References Cited

U.S. PATENT DOCUMENTS

| 5,248,924 A | * | 9/1993 | Niwa | G05B 19/408 318/569 |
| 5,323,325 A | * | 6/1994 | Izumiya | B23Q 41/06 700/174 |
| 5,391,968 A | * | 2/1995 | Niwa | G05B 19/408 318/567 |
| 5,469,352 A | * | 11/1995 | Yukutomo | G05B 19/4063 700/180 |

(Continued)

FOREIGN PATENT DOCUMENTS

| CN | 1662859 A | 8/2005 |
| CN | 102016782 A | 4/2011 |

(Continued)

OTHER PUBLICATIONS

The Notification of the First Office Action dated Jul. 5, 2018 in Chinese Patent Application No. 2016101789610 (5 pages) with an English translation (7 pages).

(Continued)

*Primary Examiner* — Jennifer L Norton
(74) *Attorney, Agent, or Firm* — Drinker Biddle & Reath LLP

(57) ABSTRACT

A numerical controller stores status data representative of its status in association with a manual data input program executed in this status. In performing a manual data input operation, the stored status data is scored based on its similarity to the current status, and manual data input programs executed in the past are recommended to an operator in the order of priority based on the result of the scoring.

6 Claims, 2 Drawing Sheets

(56) References Cited

U.S. PATENT DOCUMENTS

| | | | |
|---|---|---|---|
| 6,512,961 B1* | 1/2003 | Fukaya | G05B 19/40937 700/174 |
| 6,829,518 B2* | 12/2004 | Ogawa | G05B 19/408 318/569 |
| 7,089,099 B2* | 8/2006 | Shostak | B60C 23/005 701/29.6 |
| 7,463,945 B2* | 12/2008 | Kiesel | G05B 19/042 700/174 |
| 9,857,787 B2* | 1/2018 | Saitou | G05B 19/425 |
| 9,996,406 B2* | 6/2018 | Takayama | G06F 11/0736 |
| 2002/0022945 A1* | 2/2002 | Takayasu | G06F 11/3419 702/186 |
| 2003/0110006 A1* | 6/2003 | Nakamura | G05B 19/406 702/176 |
| 2005/0257006 A1 | 11/2005 | Yoshida et al. | |
| 2010/0174729 A1 | 7/2010 | Shin et al. | |
| 2011/0016072 A1 | 1/2011 | Inoue et al. | |
| 2011/0029817 A1* | 2/2011 | Nakagawa | G06F 11/0709 714/37 |
| 2011/0071692 A1* | 3/2011 | D'Amato | G05B 17/02 700/291 |
| 2014/0132392 A1* | 5/2014 | Kady | G06F 21/88 340/5.54 |
| 2014/0163711 A1 | 6/2014 | Matsubara et al. | |
| 2014/0189564 A1 | 7/2014 | Ohno et al. | |
| 2015/0026107 A1* | 1/2015 | Vijayaraghavan | G06Q 10/06 706/12 |
| 2015/0338843 A1* | 11/2015 | Okita | G05B 19/406 700/180 |
| 2016/0003171 A1* | 1/2016 | Ge | E02F 9/2246 701/102 |
| 2017/0300035 A1* | 10/2017 | Kawai | G05B 19/4068 |
| 2017/0308055 A1* | 10/2017 | Hoshino | G05B 19/409 |
| 2018/0031618 A1* | 2/2018 | Friedlander | G01R 21/133 |
| 2018/0095452 A1* | 4/2018 | Hitomi | G05B 19/4155 |
| 2019/0227535 A1* | 7/2019 | von Sobbe | A61B 5/0077 |

FOREIGN PATENT DOCUMENTS

| | | |
|---|---|---|
| CN | 103902869 A | 7/2014 |
| JP | H04-191907 A | 7/1992 |
| JP | H05-73125 A | 3/1993 |
| JP | 2000-066711 A | 3/2000 |
| JP | 2001-255916 A | 9/2001 |
| WO | WO-2014/091543 A1 | 6/2014 |

OTHER PUBLICATIONS

Notification of Reasons for Refusal dated May 30, 2017 in Japanese Patent Application No. 2015-065798 (2 pages) with an English translation (2 pages).

* cited by examiner

FIG. 2

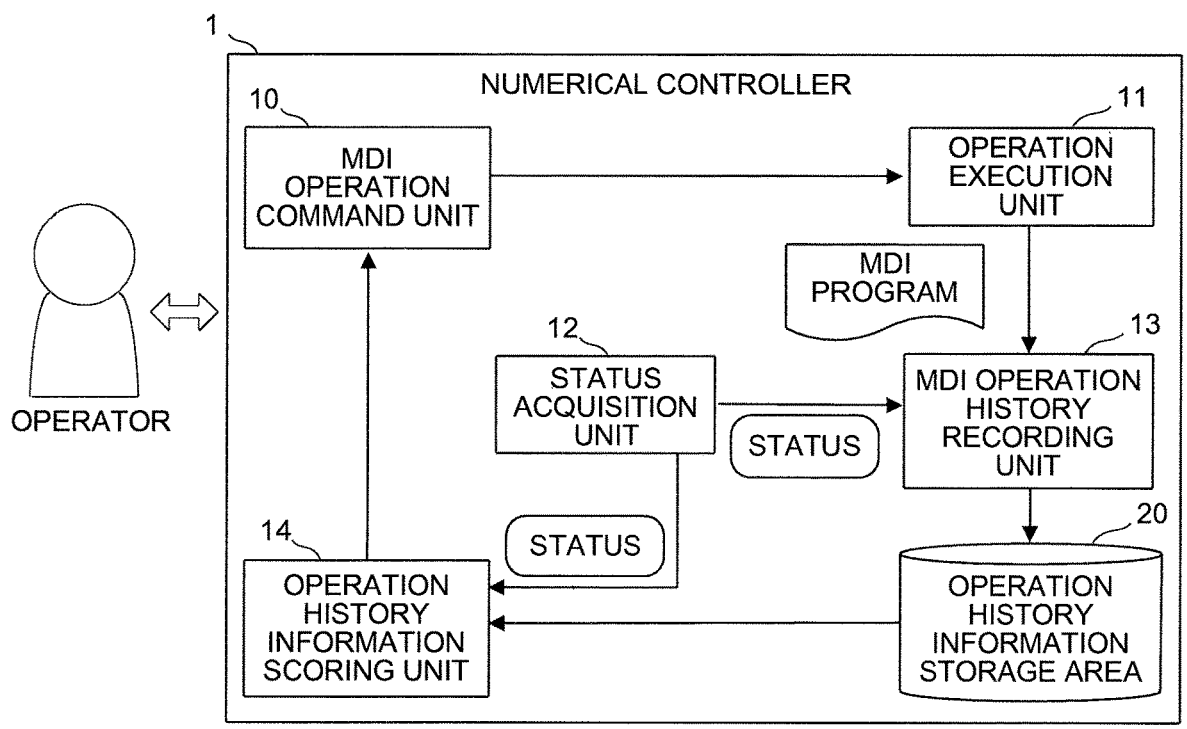

FIG. 3

STATUS OF NUMERICAL CONTROLLER
  -TIME
  -MACHINE TOOL OPERATION SIGNAL
     • SPINDLE-ON SIGNAL
     • OVER-TRAVEL (OUT-OF-RANGE AXIS) SIGNAL
     • ALARM-ON SIGNAL
     • REFERENCE POINT PROBABILITY COMPLETION
       (ALIGNMENT COMPLETION) SIGNAL
     • ETC
  -USER-DEFINED SIGNAL
     • MACHINE TOOL DOOR OPEN/CLOSE STATE SIGNAL
     • WORKPIECE MOUNTING COMPLETION SIGNAL
     • WORKPIECE MEASUREMENT SIGNAL
     • ETC
  -MODAL INFORMATION OF MACHINE TOOL
   (OPERATION COMMAND CODE EXECUTED LAST)
     • G01: LINEAR INTERPOLATION
     • G43: TOOL LENGTH CORRECTION EFFECTIVE
     • G55: WORKPIECE COORDINATE SYSTEM 2 SELECTED
     • ETC
  -ETC

NUMERICAL CONTROLLER WITH PROGRAM PRESENTATION FUNCTION DEPENDING ON SITUATION

RELATED APPLICATION DATA

This application claims priority under 35 U.S.C. § 119 and/or § 365 to Japanese Application No. 2015-065798 filed Mar. 27, 2015, the entire contents is incorporated herein by reference.

BACKGROUND OF THE INVENTION

Field of the Invention

The present invention relates to a numerical controller, and more particularly, to a numerical controller capable of enabling even a beginner to easily retrieve an object code.

Description of the Related Art

A manual data input (MDI) operation is often performed in minor management work such as preparatory work or tool replacement for a machine tool controlled by a MDI program. Ad hoc programs (one-line programs, hereinafter referred to as "MDI programs") are used in the MDI operation (e.g., Japanese Patent Application Laid-Open No. 2000-066711).

Many of MDI programs input for MDI operations for the same purpose have similar contents. For example, it is very likely that the same contents of an MDI program input and executed today for warm-up or tool replacement may also have been input and executed yesterday and the day before yesterday. In some cases, therefore, MDI programs to be frequently used are registered in advance in a memory of a numerical controller or the like so that they can be reused afterwards.

However, there are various types of MDI programs to be used frequently. If all these MDI programs are registered, it inevitably takes time to find a target program from the registered MDI programs.

In order to reduce labor to find the target program from a number of MDI programs, a method is provided such that the MDI programs are classified into some categories, such as warm-up, tool replacement, and the like. It is very time-consuming, however, to previously assume necessary MDI programs and determine how to classify them.

Further, there is a problem that much labor is required to re-correct the registered MDI programs or their categorization if the laboriously determined categorization is wrong or the contents of work are changed.

SUMMARY OF THE INVENTION

Accordingly, the object of the present invention is to provide a numerical controller capable of easily finding a target MDI program from MDI programs executed in the past and reusing it.

A numerical controller according to, the present invention performs MDI operation control based on a manual data input (MDI) program. The numerical controller comprises: an operation history information storage area configured to store operation history information including status data representative of a status of the numerical controller in association with the MDI program; an MDI operation command unit configured to command execution of an operation according to the MDI program based on a user's operation; an operation execution unit configured to perform the operation based on the MDI program in response to the command from the MDI operation command unit; a status acquisition unit configured to acquire the status data representative of the status of the numerical controller; an operation history recording unit configured to generate the operation history information by associating the MDI program executed by the MDI operation execution unit and status data at the time of execution of the MDI program acquired by the status acquisition unit and record the generated operation history information into the operation history information storage area; and an operation history information scoring unit configured to score the similarity between the status data acquired from the status acquisition unit and the status data of the operation history information recorded in the operation history information storage area and output the operation history information associated with the result of the scoring to the MDI operation command unit. The MDI operation command unit displays information on MDI programs of the operation history information sorted based on the result of the scoring and commands execution of an MDI operation according to the MDI program selected or input by the user, based on the user's operation.

The status data may include at least one of the time of the execution of the MDI program, the status of a machine tool operation signal immediately before the status acquisition, the status of a user-defined signal immediately before the status acquisition, modal information immediately before the status acquisition, and the name of a machining program that has been executed immediately before the status acquisition.

The operation history information scoring unit may score the similarity between the status data acquired from the status acquisition unit and the status data of the operation history information recorded in the operation history information storage area based on the number of coincident status data.

The operation history information scoring unit may score the similarity between the status data acquired from the status acquisition unit and the status data of the operation history information recorded in the operation history information storage area by adding up values weighted according to the types of coincident status data.

According to the present invention, an MDI program used in a status similar to the current status, among other MDI programs executed in the past, is preferentially displayed, so that an operator's labor for finding an MDI program suitable for the current status can be reduced.

Since the displayed MDI program is automatically changed based on status data representative of a status at the time of use of the MDI program, the operator need not register or categorize MDI programs. Even when work contents are changed in the middle of work, moreover, an optimal status can be naturally obtained after use without requiring any special work.

BRIEF DESCRIPTION OF THE DRAWINGS

The above and other objects and features of the present invention will be obvious from the ensuing description of embodiments with reference to the accompanying drawings, in which:

FIG. 2 is a functional block diagram showing one embodiment of the numerical controller according to the present invention; and FIG. 3 is a diagram showing an example of items of status data in the numerical controller.

DETAILED DESCRIPTION OF THE PREFERRED EMBODIMENTS

Figure 1:
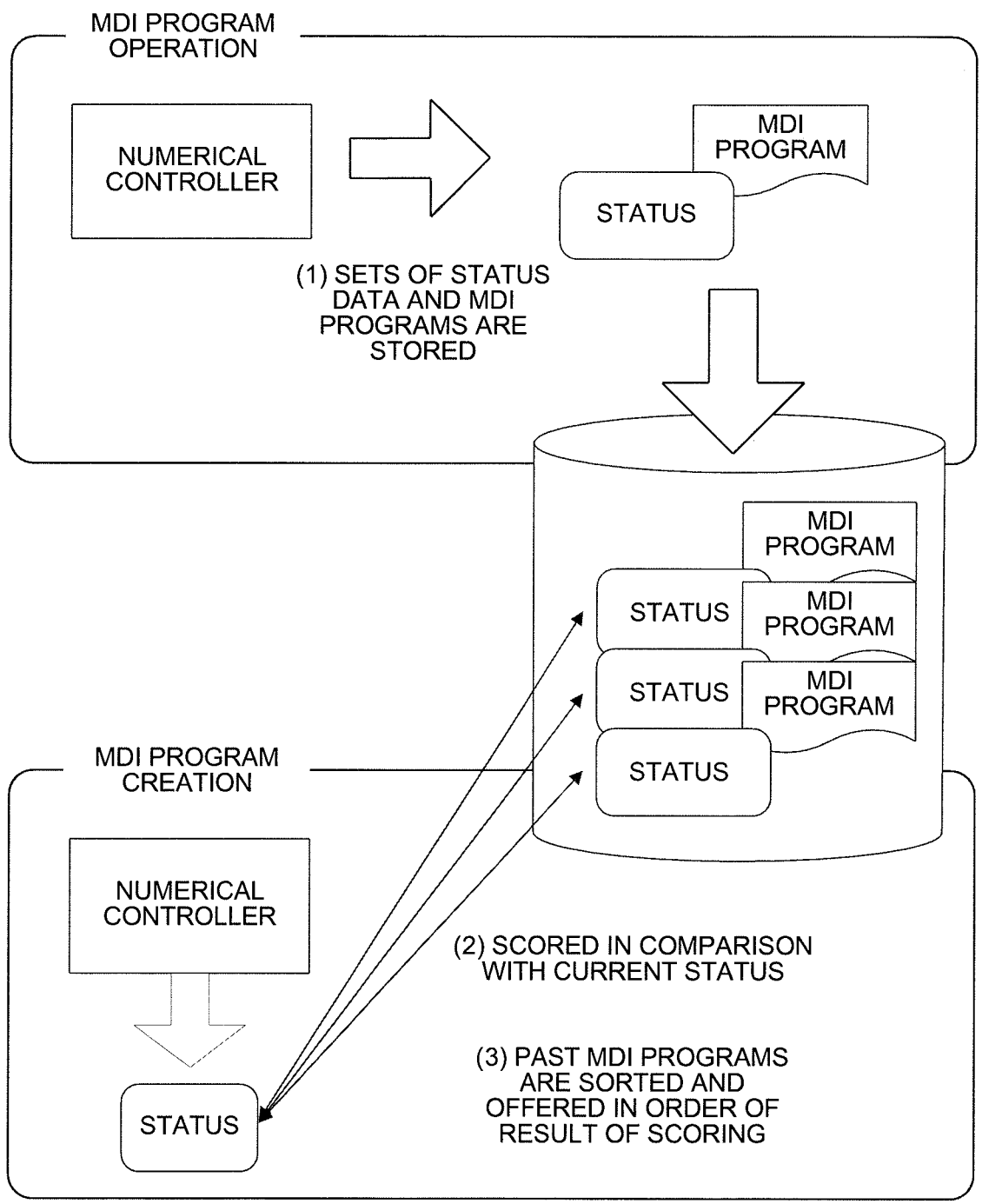
FIG. 1 is a diagram illustrating an outline of an MDI program presentation function of a numerical controller according to the present invention.

As shown in FIG. 1, the present invention provides functions of previously storing a text of an MDI program and run-time status information of a numerical controller in association with each other when the MDI program is executed and recommending MDI programs under similar conditions for the creation of the next MDI program.

In general, MDI programs required for an MDI operation vary depending on the time zone and the state of a machine tool. If the operation mode of the numerical controller is switched to an MDI operation mode on the morning of a day when no program operation is performed yet, for example, it is more common to first execute an MDI program for warm-up than to suddenly execute an MDI program for workpiece measurement. If the operation is interrupted and the operation mode is switched to the MDI operation mode while the machine tool is being operated, moreover, the MDI program for warm-up is unnecessary, and the possibility of executing an MDI program for the replacement of a broken tool is rather high.

The problems are solved by presenting an optimal MDI program to an operator depending on the situation by the following method, based on the above rules of thumb as a premise.

(Procedure 1)

Status data (time, various modals and signals, states of the machine tool such as the name of a program to be executed, ambient information, etc.) indicative of a status in which an MDI program operation is performed is stored in association with the executed MDI program.

(Procedure 2)

In switching the operation mode to the MDI operation mode and creating the MDI programs, status data obtained at the moment concerned and the previously stored status data are compared with each other, and the similarity of these status data is scored.

(Procedure 3)

Based on the result of the scoring of the status data, the correlatively stored MDI programs are sorted and offered to the operator.

FIG. 2 is a functional block diagram of a numerical controller according to one embodiment of the present invention. A numerical controller 1 according to the present embodiment comprises an MDI operation command unit 10, an operation execution unit 11, a status acquisition unit 12, an MDI operation history recording unit 13, an operation history information scoring unit 14, and an operation history information storage area 20.

The MDI operation command unit 10 selects an MDI program based on the operator's operation and commands an operation based on the selected MDI program to the operation execution unit 11. The MDI operation command unit 10, like that of a conventional numerical controller, accepts an input of the MDI program from the operator and commands an operation based on the input MDI program to the operation execution unit 11. In addition to this, when the operator performs a reference operation for an operation history, the MDI operation command unit 10 receives a plurality of pieces of operation history information including the MDI program scored by the operation history information scoring unit 14 (described later), sorts the received pieces of operation history information in the order of the result of the scoring, and presents the result of the sorting as an order of priority to the operator. An operation based on the MDI program included in the operation history selected from the presented operation history information by the operator is commanded to the operation execution unit 11.

The operation execution unit 11 executes the MDI program selected based on the command from the MDI operation command unit 10 and performs operation control of the machine as a controlled object.

The status acquisition unit 12 receives a command from the MDI operation history recording unit 13 or the operation history information scoring unit 14, collects the status of the numerical controller 1 at the time of the reception of the command, and generates and outputs status data based on the collected status.

As shown in FIG. 3, for example, the status of the numerical controller includes a time (acquired from a real-time clock (RTC) in the numerical controller), machine tool operation signal (acquired from a programmable machine controller (PMC), etc.), user-defined signal (acquired from the PMC, etc.), modal information of the machine tool (acquired from the operation execution unit 11, etc.), and the like.

The time represents the point in time when the status is acquired. Generally, in a numerical controller, the same work is often performed in MDI operations in the same time zone of each day (early-morning warm-up, etc.). Thus, the time can be used as an index of the MDI program selection.

Further, the machine tool operation signal, such as a spindle-on signal, over-travel signal, or the like, and the user-defined signal, such as a machine tool door open/close state signal, workpiece mounting completion signal, or the like represent operating conditions of the machine tool controlled by the numerical controller and its peripheral devices. If the operating conditions of the machine tool and the peripheral devices are the same, similar work is often performed in the MDI operations. Thus, the states of these signals can be used as an index of the MDI program selection.

If an operation in process is interrupted, as indicated by G01 (LINEAR INTERPOLATION), G43 (TOOL LENGTH CORRECTION EFFECTIVE), etc., moreover, modal information corresponding to an operation command code which has been executed last before the interruption of the operation represents an operation state immediately before the interruption. When an MDI operation is performed in a similar operation state, similar work is performed in many cases. Thus, the modal information can be used as an index of the MDI program selection.

Besides the above information, any other pieces of information, such as the ambient temperature, external emergency information, etc., indicative of circumstances related to the motive of the MDI operation can be used as statuses to be acquired.

When the operation execution unit 11 performs an operation based on the MDI program, the MDI operation history recording unit 13 acquires status data on the status at the start of the operation and records the acquired status data, in association with the MDI program for the operation, into the operation history information storage area 20. Information related to the recorded MDI program includes a program name and a program text for the identification of the MDI program.

On receiving a command from the MDI operation command unit 10, the operation history information scoring unit 14 acquires status data on the current status from the status acquisition unit 12 and scores the similarity between the acquired current status data and the status data included in operation history information recorded in the operation history information storage area 20. The operation history information scoring unit 14 then outputs the operation history information and the result of the scoring of the similarity between the status data to the MDI operation command unit 10.

In a method for scoring the similarity between the status data, for example, the status data may be compared for each of their items so that the number of items of which status date coincide with each other can be counted. For signals (on-off) and modal information that take only set values, when this is done, the number of items based on the coincidence of the status data should only be counted. In the case of time that takes values within a certain range (e.g., if either of two time values is within 30 minutes relative to the other), the values may be regarded as coincident so that the number of items of which status date coincide with each other should only be counted.

In another method for scoring the similarity between the status data, the items of the status data may be weighted so that weight values related to the coincident items can be added up. For example, the status of time has a heavy weight as an index of the MDI program selection (and the same work is often performed in the same time zone), so that a weight value of 2.0 is applied. Since the weight of the status of the spindle-on signal as an index of the MDI program is not very heavy (and various works may possibly be performed while a spindle is rotating), a weight value of 0.5 is applied. In this way, weighting is performed in advance depending on the degree of the influence of the status of the numerical controller on the MDI program selection.

As in the method described above, a decision on agreement/disagreement is made for each item of the status data, and the similarity is scored by adding up weight values attached to the coincident items. In this way, operation history information including a more appropriate MDI program for the current status can be scored higher.

There are various other possible methods for scoring the similarity between the status data. For example, a condition operation method may be introduced such that agreement/disagreement for a specific item is regarded as a condition for the determination of agreement/disagreement for another specific item. In short, any scoring method may be used only if the operation history information can be properly scored according to the current status.

Based on the operation history information scored by the operation history information scoring unit 14, as described above, the MDI operation command unit 10 sorts the operation history information in the order of the result of the scoring and presents the result of the sorting as the order of priority to the operator.

In this way, the numerical controller 1 of the present embodiment preferentially presents to the operator the MDI program used in a status closest to the current status, among other MDI programs used for the MDI operation in the past. Thus, the operator can relatively easily find the MDI program suitable for the current status.

While an embodiment of the present invention has been described herein, the invention is not limited to the above-described embodiment and may be suitably modified and embodied in various forms.

The invention claimed is:

1. A numerical controller which performs manual data input (MDI) operation control based on an MDI program, the numerical controller comprising:

an operation history information storage area configured to store operation history information including status data representative of a status of the numerical controller in association with the MDI program;

the numerical controller configured to perform a method comprising:

commanding execution of an operation according to the MDI program based on a user's operation;

performing the operation based on the MDI program in response to the commanding;

acquiring the status data representative of the status of the numerical controller;

generating the operation history information by associating the MDI program and acquired status data at a time of execution of the MDI program and recording the generated operation history information into the operation history information storage area;

scoring a similarity between the acquired status data and the status data of the operation history information recorded in the operation history information storage area and outputting the operation history information associated with a result of the scoring; and displaying information on MDI programs of the operation history information sorted based on the result of the scoring and commanding execution of an MDI operation according to the MDI program selected or input by the user, based on the user's operation.

2. The numerical controller according to claim 1, wherein the status data includes at least one of the time of execution of the MDI program, a status of a machine tool operation signal immediately before the status data is acquired, a status of a user-defined signal immediately before the status data is acquired, modal information immediately before the status data is acquired, and a name of a machining program that has been executed immediately before the status data is acquired.

3. The numerical controller according to claim 1, wherein the numerical controller is configured to score the similarity between the acquired status data and the status data of the operation history information recorded in the operation history information storage area based on a number of coincident status data.

4. The numerical controller according to claim 1, wherein the method comprises:

scoring a similarity between the acquired status data and the status data of the operation history information recorded in the operation history information storage area by adding up values weighted according to types of coincident status data.

5. The numerical controller according to claim 2, wherein the numerical controller is configured to score the similarity between the acquired status data and the status data of the operation history information recorded in the operation history information storage area based on a number of coincident status data.

6. The numerical controller according to claim 2, wherein the method comprises:

scoring a similarity between the acquired status data and the status data of the operation history information recorded in the operation history information storage area by adding up values weighted according to types of coincident status data.

* * * * *